(12) United States Patent
Hoshi

(10) Patent No.: US 6,671,496 B1
(45) Date of Patent: Dec. 30, 2003

(54) TRANSMITTER AND RECEIVER COMMUNICATION APPARATUS WITH TRANSMITTER SWITCH AND RECEIVER SWITCH

(75) Inventor: Yoshiyuki Hoshi, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 495 days.

(21) Appl. No.: 09/653,373

(22) Filed: Sep. 1, 2000

(30) Foreign Application Priority Data

Sep. 2, 1999  (JP) ............................................. 11-249324

(51) Int. Cl.$^7$ ................................................. H04B 1/44
(52) U.S. Cl. ............................. 455/78; 455/73; 455/82; 455/83; 455/84; 333/101
(58) Field of Search ............................. 455/73, 78, 79, 455/82–84; 333/101

(56) References Cited

U.S. PATENT DOCUMENTS

| | | | | |
|---|---|---|---|---|
| 5,097,484 A | * | 3/1992 | Akaiwa ...................... 375/267 |
| 5,475,875 A | * | 12/1995 | Katsuyama et al. ......... 455/275 |
| 5,621,770 A | * | 4/1997 | Zastera ........................ 375/347 |
| 5,630,213 A | * | 5/1997 | Vannatta ...................... 455/133 |
| 5,640,695 A | * | 6/1997 | Fitzgerald ..................... 455/134 |
| 5,809,405 A | | 9/1998 | Yamaura |
| 5,913,153 A | * | 6/1999 | Nakamoto et al. .............. 455/78 |
| 5,933,122 A | | 8/1999 | Sauer et al. |
| 6,021,317 A | * | 2/2000 | Irvin ............................ 455/78 |
| 6,108,526 A | * | 8/2000 | van der Plas ................. 455/78 |
| 6,128,476 A | * | 10/2000 | Fujita .......................... 455/101 |
| 6,296,565 B1 | * | 10/2001 | Kenkel et al. ............. 455/277.2 |
| 6,330,433 B1 | * | 12/2001 | Jager ........................ 455/277.2 |
| 6,518,855 B1 | * | 2/2003 | Gerlach et al. ............... 333/103 |
| 6,549,760 B1 | * | 4/2003 | Honma et al. ............... 455/101 |

FOREIGN PATENT DOCUMENTS

| | | |
|---|---|---|
| EP | 0 740 430 A2 | 10/1996 |
| JP | 668 668 A1 * | 2/1995 |

* cited by examiner

Primary Examiner—Nay Maung
Assistant Examiner—Sujatha Sharma
(74) Attorney, Agent, or Firm—Pearne & Gordon LLP

(57) ABSTRACT

According to the invention, a transmitter antenna selector switch 109 or a receiver antenna selector switch 111 is respectively connected between the first antenna 101a and the second antenna 101b and the transmitter 103 or the receiver 105. Transmission signals output from the transmitter 103 are supplied to either the first antenna 101a or the second antenna 101b in transmission, while reception signals are received from either the first antenna 101a or the second antenna 101b via the receiver antenna selector switch 111 in reception.

8 Claims, 5 Drawing Sheets

|  |  | FIRST CONTROL SIGNAL C1 | SECOND CONTROL SIGNAL C2 |
|---|---|---|---|
| TRANSMISSION | FIRST ANTENNA 101a SELECTED | H | L |
| | SECOND ANTENNA 101b SELECTED | L | H |
| RECEPTION | FIRST ANTENNA 101a SELECTED | L | H |
| | SECOND ANTENNA 101b SELECTED | H | L |

TRANSMITTER AND RECEIVER COMMUNICATION APPARATUS WITH TRANSMITTER SWITCH AND RECEIVER SWITCH

BACKGROUND OF THE INVENTION

The present invention relates to communications apparatus such as a portable telephone set and a PHS (Personal Handyphone System) which is equipped with a first and a second antenna and performs communications via antenna switchover, and in particular, to communications apparatus which uses fewer signals to suppress a decrease in the transmission power and degradation in the receiving sensitivity.

Conventionally, communications apparatus to perform diversity reception for base stations and mobile stations is equipped with a plurality of antennas and selects an antenna which shows the highest signal level among those received by the plurality of antennas in order to perform reception by using the antenna, so that degradation in the receiving sensitivity caused by fading during travelling can be suppressed.

An example of the related art is shown in FIG. 5. FIG. 5 is a configuration diagram showing the conventional communications apparatus. In FIG. 5, the communications apparatus according to the related art is communications apparatus such as a PHS for performing communications via the TDMA (Time Division Multiple Access) system. The communications apparatus in FIG. 5 is composed of a transmitter 11, a receiver 13, a transmission/reception selector switch 15 for switching to the transmitter 11 or the receiver 13, antennas 17a and 17b, an antenna selector switch 19 for switching over the antennas 17a and 17b, and a controller 21 which generates a control signal C11 for controlling the transmission/reception selector switch 15 and supplies the control signal C11 to the transmission/reception selector switch 15 as well as generates a control signal C12 for controlling the antenna selector switch 19 and supplies the control signal C12 to the antenna selector switch 19.

The control signal C11 is composed of a transmission selecting signal C11a for switching to the transmitter 11 and a reception selecting signal C11b for switching to the receiver 13. The control signal C12 is composed of an antenna selecting signal C12a for switching to the antenna 17a and an antenna selecting signal C12b for switching to the antenna 17b.

The transmission/reception selector switch 15 switches to the transmitter 11 when the transmission selecting signal C11a is high and the reception selecting signal is low, and switches to the receiver 13 when the transmission selecting signal C11a is low and the reception selecting signal C11b is high. Meanwhile, the antenna selector switch 19 switches to the antenna 17a when the antenna selecting signal C12a is high and the antenna selecting signal C12b is low, and switches to the antenna 17b when the antenna selecting signal C12a is low and the antenna selecting signal C12b is high.

In the conventional communication apparatus, an antenna which received a signal having a higher signal level is identified by comparing signal levels of receive signals received via the antenna 17a and the antenna 17b, and uses the identified antenna which received a signal having a higher signal level to perform reception.

For example, as shown in FIG. 6, when transmission is performed at a transmitting slot T1 by using the antenna 17a, the transmission selecting signal C11a is driven high and the reception selecting signal C11b is driven low, the antenna selecting signal C12a is driven high, and the antenna selecting signal C12b is driven low. Meanwhile, when reception is performed at a receiving slot R1 by using the antenna 17b, the transmission selecting signal C11a is driven low and the reception selecting signal C11b is driven high, the antenna selecting signal C12a is driven low, and the antenna selecting signal C12b is driven high.

However, the conventional communications apparatus is equipped with a transmission/reception selector switch 15 and an antenna selector switch 19 serially connected between the transmitter 11 or receiver 13 and the antenna 17a or 17b. Thus transmission signals or reception signals pass through these two switches. Accordingly, transmission signals or reception signals suffer from a signal level loss each time they pass through the switches, thus generating a decrease in the transmission power and degradation in the receiving sensitivity corresponding to the two switches.

The conventional communications apparatus is equipped with separate switches for transmission/reception switching and antenna switching respectively, thus requiring individual control signals C11 and C13. That is, in conventional apparatus in FIG. 5, the control signal C11 for controlling the transmission/reception selector switch 15 is composed of a transmission selecting signal C11a and a reception selecting signal C11b, and the control signal C12 for controlling the anntenna selector switch 19 is composed of an antenna selecting signal C12a and an antenna selecting signal C12b, thus requiring control via four control signals.

SUMMARY OF THE INVENTION

The invention is proposed in view of the conventional problems and aims at providing communications apparatus which suppresses a decrease in the transmission power and degradation in the receiving sensitivity via fewer control signals.

In order to solve the foregoing problems, communication apparatus according to the first aspect of the invention comprises a first antenna, a second antenna, a controller for generating first and second control signals based on the transmission or reception instruction and selection instruction from the first or second antenna, a transmitter switch for switching transmission signals to either the first or second antenna via connection switchover depending on the first and second control signals, and a receiver switch for receiving signals from either the first or second antenna via connection switchover depending on the first and second control signals, wherein the second antenna is connected via the receiver switch when the first antenna is connected via the transmitter switch and that the first antenna is connected via the receiver switch when the second antenna is connected via the transmitter switch.

Communication apparatus according to the second aspect of the invention comprises a first antenna, a second antenna, a transmitter, a receiver, a controller for generating a first control signal which is enabled when the first antenna is selected in transmission and a second control signal which is enabled when the second antenna is selected or generating a first control signal which is enabled when the second antenna is selected in reception and a second control signal which is enabled when the first antenna is selected, a first transmitter switch which is connected between the first antenna and the transmitter and is turned on/off based on the first control signal, a second transmitter switch which is connected between the second antenna and the transmitter and is turned on/off based on the second control signal, a first receiver switch which is connected between the first antenna and the receiver and is turned on/off based on the second control signal, and a second receiver switch which is connected between the second antenna and the receiver and is turned on/off based on the first control signal.

Communication apparatus according to the third aspect of the invention is communications apparatus according to the first aspect or second aspect of the invention, wherein the controller generates either the first control signal or the second control signal and that the other second control signal or first control signal is generated via signal inversion of the first control signal or the second control signal.

Communications apparatus according to the fourth aspect of the invention is communications apparatus according to either of the first, second or third aspect of the invention, wherein the apparatus comprises detecting means for detecting the signal level or signal field strength of the transmission signals or reception signals and that the controller makes an instruction of selecting the first or second antenna based on the detection results of the detecting means.

Communications apparatus according to the fifth aspect of the invention is communications apparatus according to either of the first, second, third or fourth aspect of the invention, wherein the apparatus performs the transmission or reception via the Time Division Multiple Access (TDMA) system.

In communications apparatus according to the invention, when the controller generates the first and second control signals based on an instruction of transmission or reception and an instruction of selecting the first or second antenna, transmission signals are connected to either the first or second antenna in the transmitter switch and signals are received from either the first or second antenna in the receiver switch, via connection switchover depending on the first and second control signals. When the first antenna is connected in the transmitter switch, the second antenna is connected in the receiver switch. When the second antenna is connected in the transmitter switch, the first antenna is connected in the receiver switch.

Thus, in transmission, transmission signals are output from the transmitter are supplied to either the first or second antenna via the transmitter switch, while in reception, receive signals are received from either the first or second antenna via the receiver switch. In conventional apparatus, a transmission/reception selector switch and an antenna selector switch are serially connected between the first or second antenna and a transmitter or receiver, thus generating a signal loss corresponding to two switches. According to the invention, a transmitter switch or receiver switch is respectively connected between the first and second antennas and the transmitter or receiver, thus generating a signal loss corresponding to a single switch on the transmission signals or reception signals. This can reduce a signal level loss in the switch and suppress a decrease in the transmission power or degradation in the receiving sensitivity, thus reducing the error rate of signals.

Especially, in the communications apparatus according to the second aspect of the invention, when the first antenna is selected in transmission, the first transmitter switch and the second receiver switch are turned on via the first control signal so that the output of the transmitter is connected to the first antenna and the second antenna is connected to the receiver. The same connection state is attained when the second antenna is selected in reception. Meanwhile, when the second antenna is selected in transmission, the second transmitter switch and the first receiver switch are turned on so that the output of the transmitter is connected to the second antenna and the first antenna is connected to the receiver. The same connection state is attained when the first antenna is selected in reception.

Conventional communications apparatus comprised independent switches for transmission/reception switchover and antenna switchover and generates control signals for respective switches via independent logic. Communications apparatus according to the invention generates control signals via complex logic composed of transmission/reception switchover and antenna switchover conditions to let the transmitter switch or receiver switch operate correspondingly. This reduces the number of control signals and is advantageous in circuit integration or apparatus downsizing from the viewpoint of the wiring and the number of output ports of the controller.

Especially, in communications apparatus according to the third aspect of the invention, the controller generates either a first control signal or a second control signal and generates the other signal by inverting the other signal via the inverter (NOT gate), etc. This reduces the number of control signals to half that in communications apparatus according to the second aspect of the invention.

Especially, in communications apparatus according to the fourth aspect of the invention, the detecting means preferably detects the signal level or signal field strength of the transmission signals or reception signals and the controller preferably makes an instruction of selecting the first or second antenna based on the detection results of the detecting means, and in communications apparatus according to the fifth aspect of the invention, transmission or reception is preferably performed via the TDMA (Time Division Multiple Access) system.

For example, in the antenna-switched diversity reception, antenna switchover is made based on information internal to the apparatus such as C/N (carrier to noise ratio), signal level (for a system where noise power is specified by the internal noise), or signal field strength. In case the reception system path is identical with the transmission system path, diversity reception is allowed where reception level prior to transmission is detected for each antenna and an antenna showing the higher reception level is selected. Further, in communications via the Time Division Multiple Access (TDMA) system, transmission or reception is made at a different timing (slot) on the time axis; antenna switchover based on the internal information such as C/N, signal level, and signal field strength before starting the transmitting/receiving slot can reduce noise which accompanies antenna switchover.

DETAILED DESCRIPTION OF THE PREFERRED EMBODIMENT

An embodiment of communications apparatus according to the invention will be detailed with reference to drawings. Communications apparatus according to this embodiment is a portable telephone set or PHS terminal, etc. which performs TDMA communications via the Time Division Duplex (TDD) system and the Time Division Multiple Access (hereinafter referred to as TDMA) system.

Figure 1:
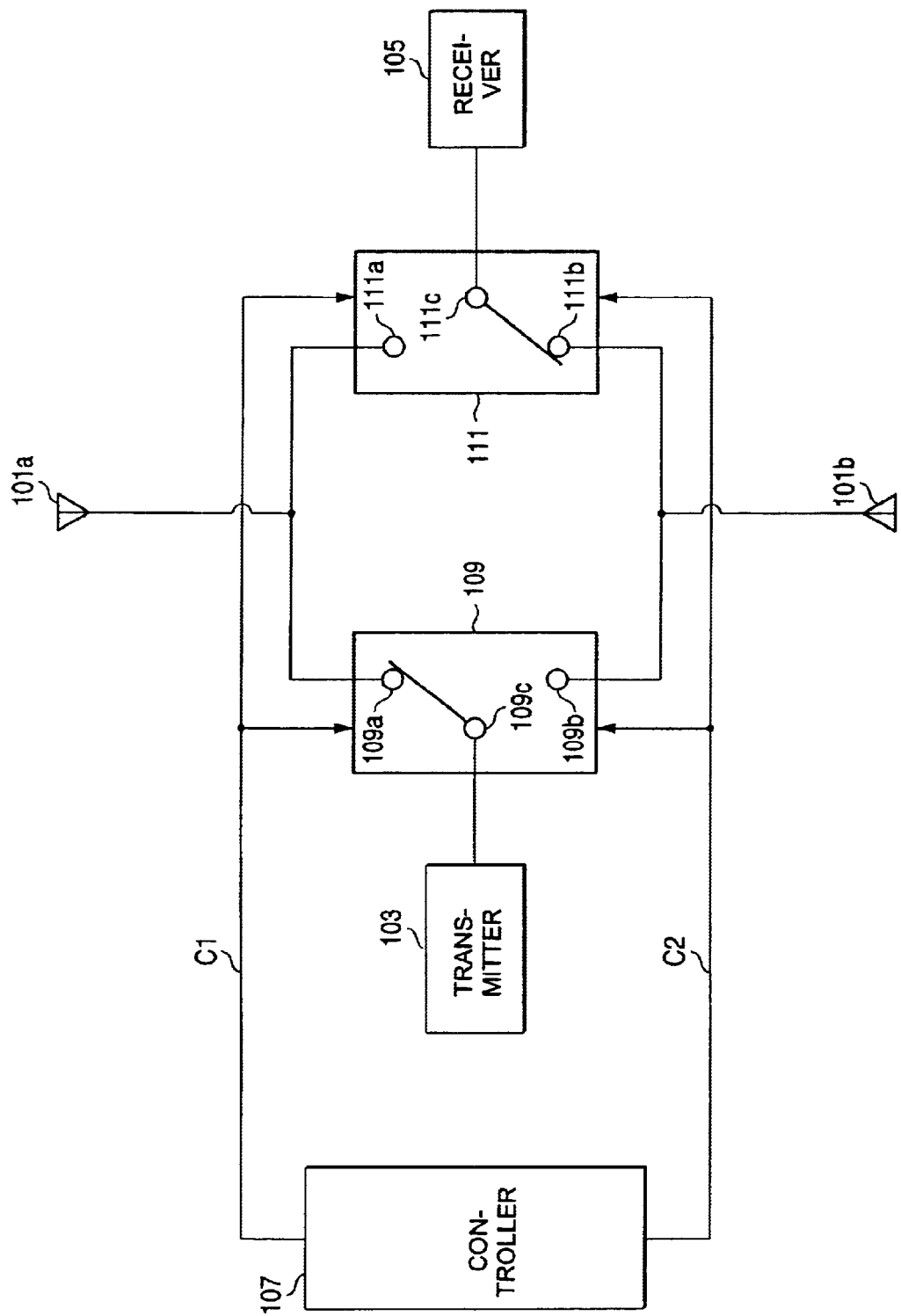
FIG. 1 is a block diagram of communications apparatus according to an embodiment of the invention.

FIG. 1 is a block diagram of communications apparatus according to an embodiment of the invention. In FIG. 1, communications apparatus according to this embodiment comprises a first antenna 101a, a second antenna 101b, a transmitter 103 for supplying transmission signals, a receiver 105 for demodulating reception signals, an controller 107 for generating the first control signal C1 and the second control signal C2, and a transmitter antenna selector switch 109 corresponding to a transmitter switch according to the first aspect of the invention, and a receiver antenna selector switch 111 corresponding to a receiver switch.

The first and second antennas 101a and 101b are antennas used for transmission and reception. The first antenna 101a is connected to the transmitter antenna selector switch 109 and the receiver antenna selector switch 111. The second antenna 101b is also connected to the transmitter antenna selector switch 109 and the receiver antenna selector switch 111.

The controller 107 is realized, for example, by a CPU microcomputer or a DSP, and generates the first and second control signals C1 and C2 to supply the control signals to the transmitter antenna selector switch 109 and the receiver antenna selector switch 111 respectively.

The controller 107 selects an antenna which shows the higher signal level or signal field strength level based on the detection result of the detecting means such as Received Signal Strength Indicator (RSSI) (not shown) connected to each antenna and detect signal level of reception signal or received electric field strength level. That is, in performing antenna-switched diversity reception, antenna switchover is performed based on the signal level or signal field strength level. In case the reception system path is identical with the transmission system path, diversity reception is allowed where signal reception level prior to transmission is detected for each antenna and an antenna showing the higher signal reception level is selected.

The transmitter antenna selector switch 109 comprises three terminals 109a, 109b and 109c. The terminal 109a is connected to the first antenna 101a, the terminal 109b to the second antenna 101b, and the terminal 109c to the transmitter 103. The receiver antenna selector switch 111 comprises three terminals 111a, 111b and 111c. The terminal 111a is connected to the first antenna 101a, the terminal 111b to the second antenna 101b, and the terminal 111c to the receiver 105.

Figure 2:
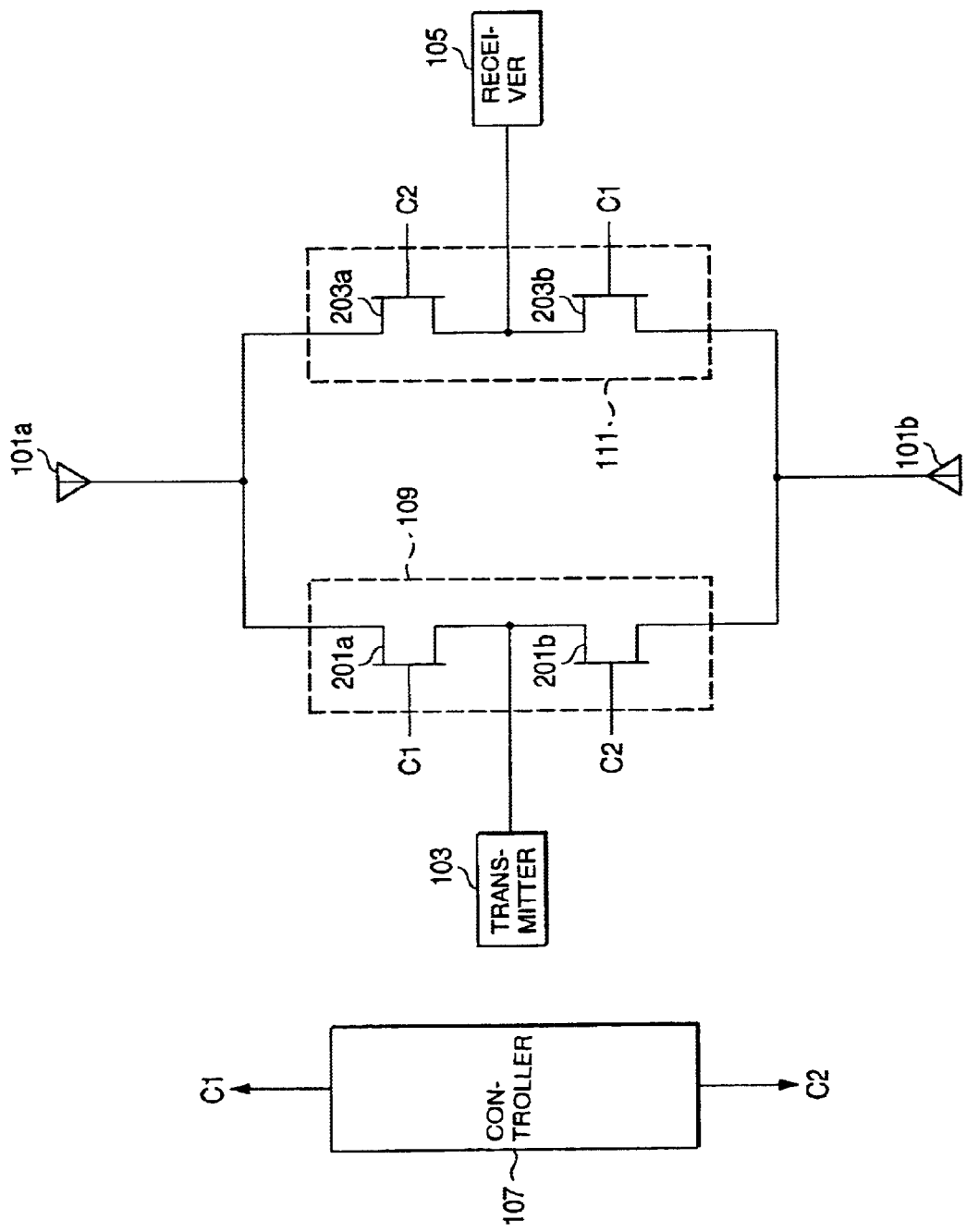
FIG. 2 is a circuit diagram showing a specific circuit of the transmitter antenna selector switch and the receiver antenna selector switch in communications apparatus according to this embodiment.

FIG. 2 is a circuit diagram showing a specific circuit of the transmitter antenna selector switch 109 and the receiver antenna selector switch 111 in communications apparatus according to this embodiment. In FIG. 2, the transmitter antenna selector switch 109 comprises two n-channel FETs 201a and 201b connected serially as a first transmitter switch and a second transmitters witch. The FET 201a is connected between the first antenna 101a and the transmitter 103 and the FET 201b is connected between the second antenna 101b and the transmitter 103. The first control signal C1 is supplied to the gate electrode of the FET 201a and the second control signal C2 to the gate electrode of the FET 201b.

Similarly, the receiver antenna selector switch 111 comprises two n-channel FETs 203a and 203b connected serially as a first receiver switch and a second receiver switch. The FET 203a is connected between the first antenna 101a and the receiver 105 and the FET 203b is connected between the second antenna 101b and the receiver 105. The second control signal C2 is supplied to the gate electrode of the FET 203a and the first control signal C1 to the gate electrode of the FET 203b.

Figures 3, 4:
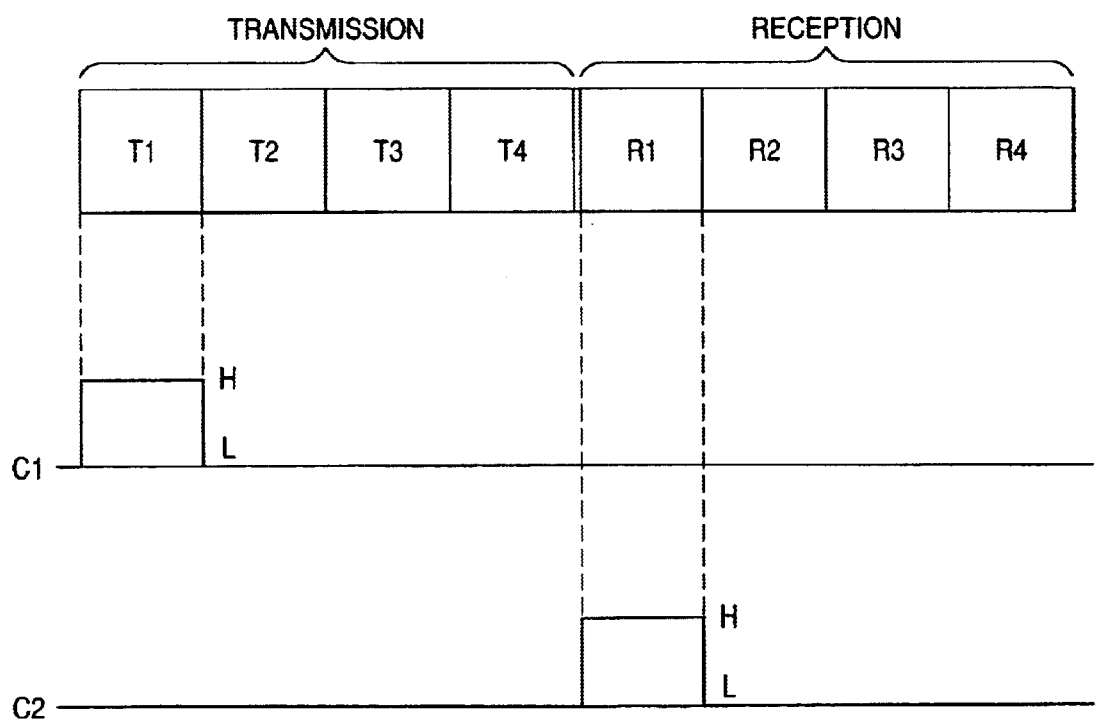
FIG. 3 is an explanatory drawing showing the relationship between the first control signal and the second control signal generated by the controller and the signal operation modes.
FIG. 4 is an explanatory drawing illustrating the operation of transmission and reception.

Next, referring to FIG. 3, the first control signal C1 and the second control signal C2 depending on the conditions for transmission/reception switchover and antenna switchover will be described. FIG. 3 is an explanatory drawing showing the relationship between the first control signal C1 and the second control signal C2 generated by the controller 107 and the signal operation modes.

First, when the first antenna 101a is selected in transmission and when the second antenna 101b is selected in reception, the first control signal C1 is driven high to shift the FET 201a and FET 203b to the ON state and the second control signal C2 is driven low to shift the FET 201b and FET 203a to the OFF state. This connects the output of the transmitter 103 to the first antenna 101a as well as keeps the second antenna 101b and the receiver. 105 connected.

When the second antenna 101b is selected in transmission and when the first antenna 101a is selected in reception, the first control signal C1 is driven low to shift the FET 201a and FET 203b to the OFF state and the second control signal C2 is driven high to shift the FET 201b and FET 203a to the ON state. This connects the output of the transmitter 103 to the second antenna 101b as well as keeps the first antenna 101a and the receiver 105 connected.

Figure 5:
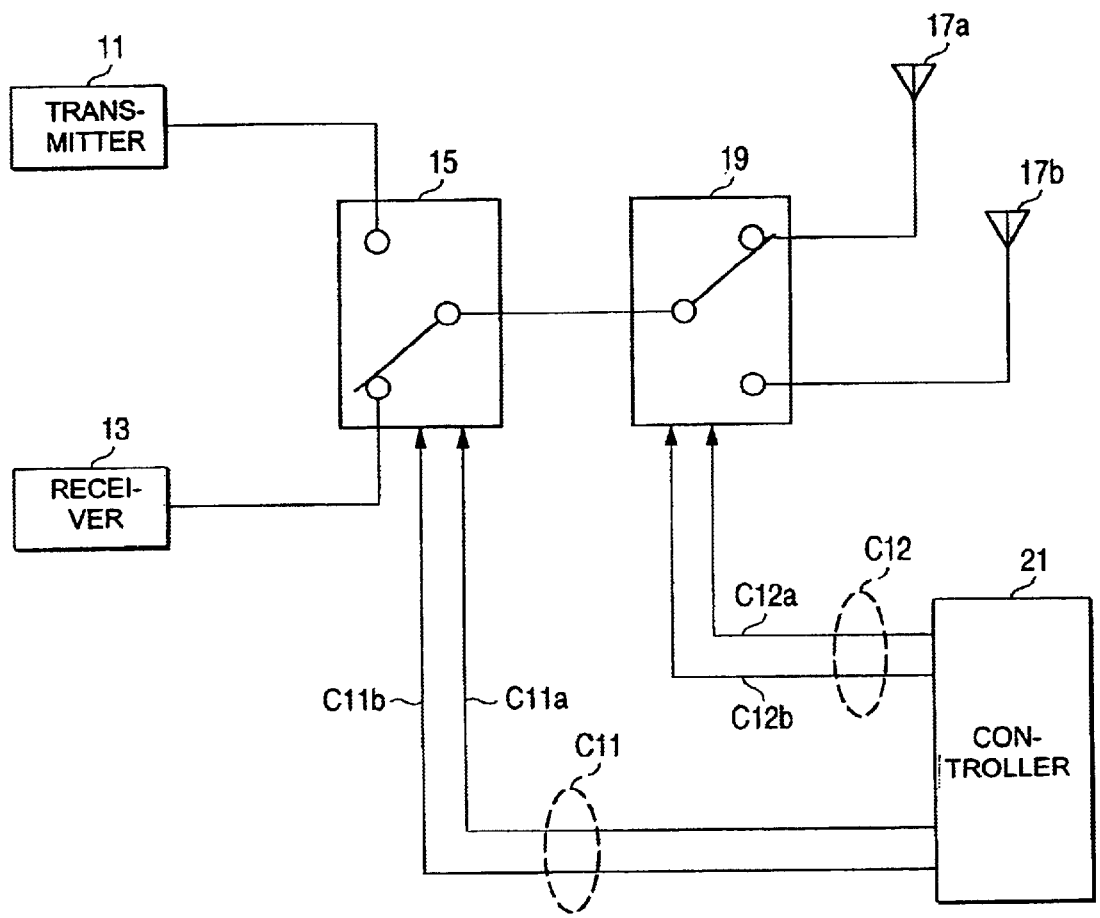
FIG. 5 is a configuration diagram showing the conventional communications apparatus.
Figure 6:
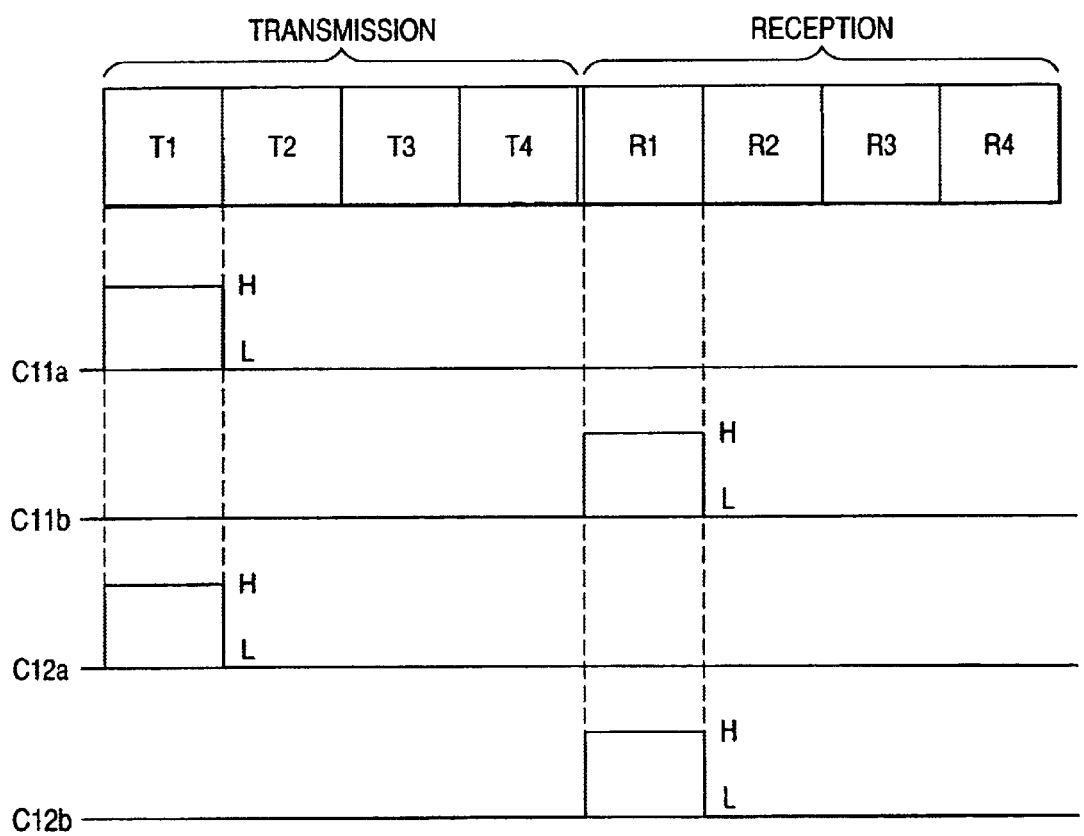
FIG. 6 is an explanatory drawing showing the relationship between the control signals and the signal operation modes.

While exemplary communications apparatus according to the related art (see FIG. 5) comprises the transmission/reception selector switch 15 and the antenna selector switch 19 independently and generates control signals C11 and C12 corresponding to the switches via independent logic, communications apparatus according to the invention generates the first control signal C1 and the second control signal C2 via complex logic composed of transmission/reception switchover and antenna switchover conditions to let the transmitter antenna selector switch 109 and the receiver antenna selector switch 111 operate correspondingly. This reduces the number of control signals from four to two and is advantageous in circuit integration or apparatus downsizing from the viewpoint of the wiring and the number of output ports of the controller.

The controller 107 may generate either the first control signal C1 or the second control signal C2 and generate the other signal by inverting the other signal via the inverter (NOT gate) This reduces the number of control signals to half that used in communications apparatus in FIG. 1 and FIG. 2. Note that the inverter must be capable of switching control signals at five to ten [$\mu$s].

Communications apparatus according to this embodiment generates the first control signal C1 and the second control signal C2 via complex logic composed of transmission/reception switchover and antenna switchover conditions so that transmission/reception switchover and antenna switchover must take place simultaneously. In case the transmitter 103 performs transmission by using either the first antenna 101a or the second antenna 101b, the receiver 105 is connected to the other antenna, so that the transmission system can be disconnected from the reception system.

Communications apparatus according to this embodiment generates the performs transmission/reception of signals at a predetermined timing based on the transmission or reception instruction via the TDD (TDMA) system. During transmission, power to the receiver 105 is turned off to place the reception system in the off-operating state, thus eliminating the influence of the reception system over the transmission system. On the other hand, during reception, power to the transmitter 103 is turned off to place the transmission system in the off-operating state, thus eliminating the influence of the transmission system over the reception system.

Further, in case the transmitter antenna selector switch 109 and the receiver antenna selector switch 111 select the same antenna in transmission, the impedance of 50 [Ω] on the antenna and the impedance of 50 [Ω] on the receiver 105 are connected in parallel as seen from the transmitter 103, which may cause the combined impedance to 25 [Ω] and transmitting power to drop by 3 [dB] or so. Communications apparatus according to this embodiment can prevent a drop in the transmission power, because, when the transmitter 103 performs transmission by using either the first antenna 101*a* or the second antenna 101*b*, the receiver 105 is connected to the other antenna, and the transmission system is disconnected from the reception system.

Next, operation of communications apparatus according to this embodiment will be described with reference to FIG. 4. FIG. 4 is an explanatory drawing illustrating the operation of transmission and reception. This figure shows the waveforms of the first control signal C1 and the second control signal C2 corresponding to the transmitting and receiving slots.

When transmission is performed at the transmitting slot T1 by using the first antenna 101*a*, the controller 107 drives the first control signal C1 high and the second control signal C2 low. This allows the transmission system to be configured where the output of the transmitter 103 is connected to the first antenna 101*a* via the FET 201*a*, separately from the reception system.

When reception is performed at the receiving slot R1 by using the first antenna 101*a*, the controller 107 drives the first control signal C1 low and the second control signal C2 high. This allows the reception system to be configured where the input to the receiver 105 is connected to the first antenna 101*a* via the FET 203*a*, separately from the transmission system.

Accordingly, Communications apparatus of this embodiment, which performs communications via the TDMA system, transmission or reception is made at a different timing (slot) on the time axis; antenna switchover based on the internal information such as signal level and signal field strength before starting the transmitting/receiving slot can reduce noise which accompanies antenna switchover.

While the example in FIG. 4 uses a single slot for transmission or reception, configuration and operation according to this embodiment are applicable to transmission/reception using a plurality of slots. For example, in a base station, two to four slots are used to communicate with a plurality of terminals. Two slots are used in 64 [kHz] data communications for remote unit of a cordless telephone set and PHS. 128 [kHz] data communications will be handled by the remote unit; in this case four slots will be required.

AS mentioned earlier, in communications apparatus according to this embodiment, transmission signals output from the transmitter 103 are supplied to either the first antenna 101*a* or the second antenna 101*b* in transmission, while reception signals are received from either the first antenna 101*a* or the second antenna 101*b* via the receiver antenna selector switch 111 in reception.

While exemplary communications apparatus according to the related art (see FIG. 5) comprises the transmission/reception selector switch 15 and the antenna selector switch 19 serially connected between the first antenna 17*a* or the second antenna 17*b* and the transmitter 11 or receiver 13. Accordingly, transmission signals or reception signals suffer from a signal loss of some 2 [dB] on the transmission signals or reception signals. On the other hand, according to the embodiment, the transmitter antenna selector switch 109 or the receiver antenna selector switch 111 is respectively connected between the first and second antennas 101*a* and 101*b*, and the transmitter 103 or the receiver 105, thus generating a signal loss corresponding to a single switch on the transmission signals or receive signals. This can reduce a signal level loss in the switch and suppress a decrease in the transmission power or degradation in the receiving sensitivity, thus reducing the error rate of signals.

As mentioned earlier, according to the communications apparatus of the invention, when the controller generates the first and second control signals based on an instruction of transmission or reception and an instruction of selecting the first or second antenna, transmission signals are connected to either the first or second antenna in the transmitter switch and signals are received from either the first or second antenna in the receiver switch, via connection switchover depending on the first and second control signals. When the first antenna is connected in the transmitter switch, the second antenna is connected in the receiver switch. When the second antenna is connected in the transmitter switch, the first antenna is connected in the receiver switch. A transmitter switch or receiver switch is respectively connected between the first and second antennas and the transmitter or receiver, thus generating a signal loss corresponding to a single switch on the transmission signals or reception signals. This can reduce a signal level loss in the switch and suppress a decrease in the transmission power or degradation in the receiving sensitivity.

Moreover, communications apparatus according to the invention generates control signals via complex logic composed of transmission/reception switchover and antenna switchover conditions to let the transmitter switch or receiver switch operate correspondingly. This reduces the number of control signals and is advantageous in circuit integration or apparatus downsizing from the viewpoint of the wiring and the number of output ports of the controller. Especially, the controller generates either a first control signal or a second control signal and generates the other signal by inverting the other signal via the inverter (NOT gate), etc. This reduces the number of control signals to half.

What is claimed is:

1. Communication apparatus comprising:
   a first antenna;
   a second antenna;
   a receiver;
   a transmitter;
   a controller for generating a first control signal and a second control signal based on the transmission or reception instruction and selection instruction of said first or second antenna;
   a transmitter switch for switching transmission signals from the transmitter to one of said first and second antenna via a transmitter connection switchover depending on the first and second control signals; and
   a receiver switch for receiving signals from one of said first and second antenna to the receiver via a receiver connection switchover depending on the first and second control signals, wherein said second antenna is connected to the receiver via said receiver switch when said first antenna is connected to the transmitter via said transmitter switch; and said first antenna is connected to the receiver via said receiver switch when said second antenna is connected to the transmitter via said transmitter switch.

2. The communications apparatus according to claim 1, wherein said controller generates one of the first control signal and second control signal, and the other control signal is generated via signal inversion.

3. The communications apparatus according to claim 1 further comprising:

a detector which detects the signal level or signal field strength of the transmission signals or reception signals, wherein said controller makes an instruction of selecting one of said first and second antenna based on the detection results of said detector.

4. The communications apparatus according to claim 1, wherein the transmission or reception operation of said communications apparatus is performed via the Time Division Multiple Access (TDMA) system.

5. Communication apparatus comprising:

a first antenna;

a second antenna;

a transmitter;

a receiver;

a controller for generating a first control signal and a second control signal, the first control signal is effective when said first antenna is selected in transmission and when said second antenna is selected in reception, the second control signal is effective when said second antenna is selected in transmission and when said first antenna is selected in reception;

a first transmitter switch which is connected between said first antenna and said transmitter and is turned on/off based on the first control signal;

a second transmitter switch which is connected between said second antenna and said transmitter and is turned on/off based on the second control signal;

a first receiver switch which is connected between said first antenna and said receiver and is turned on/off based on the second control signal; and a second receiver switch which is connected between said second antenna and said receiver and is turned on/off based on the first control signal.

6. The communications apparatus according to claim 5, wherein said controller generates one of the first control signal and the second control signal, and the other control signal is generated via signal inversion.

7. The communications apparatus according to claim 5 further comprising:

a detector which detects the signal level or signal field strength of the transmission signals or reception signals, wherein controller makes an instruction of selecting said first or second antenna based on the detection results of said detector.

8. The communications apparatus according to claim 5, wherein the transmission or reception operation of the communications apparatus is performed via the Time Division Multiple Access (TDMA) system.

* * * * *

UNITED STATES PATENT AND TRADEMARK OFFICE
CERTIFICATE OF CORRECTION

PATENT NO. : 6,671,496 B1
DATED : December 30, 2003
INVENTOR(S) : Yoshiyuki Hoshi It is certified that error appears in the above-identified patent and that said Letters Patent is hereby corrected as shown below:

Column 5,
Line 61, "...second transmitters *witch*.", should state -- ...second transmitters *switch*. --;

Column 6,
Line 24, "...101b and the *receiver*. 105...", should state -- ...101b and the *receiver* 105... --; and
Line 51, "...(NOT *gate)* This reduces...", should state -- ...(NOT *gate)*. This reduces... --.

Signed and Sealed this

Twenty-second Day of June, 2004

JON W. DUDAS
*Acting Director of the United States Patent and Trademark Office*